United States Patent [19]
He et al.

[11] Patent Number: 6,122,183
[45] Date of Patent: Sep. 19, 2000

[54] TWO-STAGE, THREE-PHASE BOOST CONVERTER WITH REDUCED TOTAL HARMONIC DISTORTION

[75] Inventors: Jin He, Plano; Mark E. Jacobs, Dallas, both of Tex.

[73] Assignee: Lucent Technologies Inc., Murray Hill, N.J.

[21] Appl. No.: 09/199,289

[22] Filed: Nov. 24, 1998

[51] Int. Cl.[7] ................................................ H02M 1/14
[52] U.S. Cl. .............................. 363/44; 363/89; 323/222
[58] Field of Search .............................. 323/222; 363/44, 363/89, 126

[56] References Cited

U.S. PATENT DOCUMENTS

| | | | |
|---|---|---|---|
| 5,414,613 | 5/1995 | Chen | 363/89 |
| 5,446,646 | 8/1995 | Miyazaki | 363/89 |
| 5,506,766 | 4/1996 | Takahashi | 363/89 |
| 5,654,882 | 8/1997 | Kanazana et al. | 363/89 |
| 5,793,625 | 8/1998 | Balogh | 323/222 |
| 5,886,891 | 3/1999 | Jiang et al. | 363/89 |

OTHER PUBLICATIONS

Y. Jiang, et al. "Simple High Performance Three–Phase Boost Rectifiers", 1994 VPEC Seminar Proceeding, pp. 39–44.

A.R. Prasad, P.D. Ziogas, and S. Manias, "An Active Power Factor Correction Technique for Three–Phase Diode Rectifiers", Sep. 1989 IEEE PESC Proceedings, pp. 58–66.

E. Ismail & R.W. Ericson, "A Single Transistor Three–Phase Resonant Switch for High Quality Rectification", Mar. 1992 IEEE PESC Proceeding, pp. 1341–1351.

R. Zhang & F.C. Lee, "Optimum PWM Pattern for a 3–Phase Boost DCM PFC Rectifier", Dec. 1996 VPEC Annual Seminar Proceeding, pp. 35–42.

*Primary Examiner*—Jeffrey Sterrett

[57] ABSTRACT

For use with a three-phase boost converter having a primary stage with a primary rectifier and a primary boost switch coupled between an input and output of the three-phase boost converter, an auxiliary stage, a method of reducing input current total harmonic distortion (THD) at the input of the three-phase boost converter, and a three-phase boost converter employing the auxiliary stage and method are provided. In one embodiment, the auxiliary stage includes: (1) an auxiliary rectifier coupled to the primary rectifier, (2) first, second and third auxiliary boost inductors interposed between the primary rectifier and the auxiliary rectifier and (3) an auxiliary boost switch, interposed between the auxiliary rectifier and the output, that conducts to induce corresponding phase currents through the first, second and third auxiliary boost inductors thereby reducing input current total harmonic distortion (THD) at the input of the three-phase boost converter.

22 Claims, 1 Drawing Sheet

TWO-STAGE, THREE-PHASE BOOST CONVERTER WITH REDUCED TOTAL HARMONIC DISTORTION

CROSS-REFERENCE TO RELATED APPLICATION

This application is related to U.S. patent application Ser. No. 09/133,105, filed Aug. 12, 1998, entitled "TWO-STAGE, THREE-PHASE BOOST CONVERTER AND METHOD OF REDUCING TOTAL HARMONIC DISTORTION FOR THE SAME" by Jin He and Mark E. Jacobs, and U.S. patent application Ser. No. 09/133,068, filed Aug. 12, 1998, entitled "TWO-STAGE, THREE-PHASE SPLIT BOOST CONVERTER AND METHOD OF REDUCING TOTAL HARMONIC DISTORTION FOR THE SAME" by Jin He and Mark E. Jacobs. The related applications are commonly assigned with the present application and are incorporated herein by reference.

TECHNICAL FIELD OF THE INVENTION

The present invention is directed, in general, to power conversion and, more specifically, to a three-phase boost converter having a primary and auxiliary stage and a method of reducing total harmonic distortion (THD) at the input of the boost converter.

BACKGROUND OF THE INVENTION

Poor input power factor and high input current total harmonic distortion (THD) generated by phase controlled and uncontrolled diode bridge rectifiers are well known problems in the power converter/rectifier industry today. Such low power factor and high THD commonly lead to input AC voltage distortions, distribution system losses, neutral harmonic currents and excitation of system resonances. To combat these problems, designers have attempted to develop improved three-phase rectifiers or converters which draw nearly sinusoidal line currents with low harmonic content and with high displacement power factor.

Three major power factor and harmonic current improvement approaches are commonly used in the industry. For medium to high power applications, AC/DC rectifiers (utility interface) often employ six-active-switch boost rectifiers. By using the proper modulation techniques for the six switches, it is possible to control the rectifier output voltage while maintaining nearly sinusoidal input line currents at unity power factor. However, this approach experiences limitations such as high system costs due to the need for a complex pulse-width modulation (PWM) control scheme for the six active power switches and associated drive circuitry.

Another approach for power factor and harmonic current improvement includes the use of three single-phase power factor correction (PFC) isolated AC/DC rectifiers. Such a configuration is more attractive than the previous approach because of a reduced number of active switches. The three single-phase PFC isolated AC/DC rectifiers, however, require three isolated high frequency DC/DC converters and, hence, it is still an expensive and complex PFC approach.

A single-switch, discontinuous conduction mode (DCM) three-phase boost PFC converter with six-diode bridge rectifier has been proposed and immediately drew interest due to its simplicity and low cost. This scheme illustrates that three-phase, low harmonic rectification is possible without either the use of large, low frequency passive elements or multiple active power switches and complex control. However, since such a topology and control scheme originates from a single-phase counterpart, it suffers from the same problems as its single-phase counterpart, namely, high switch peak-current stress, a requirement of fairly large electromagnetic interference (EMI) filters and a very high DC bus voltage for lowering the THD.

Although a sinusoidal peak current can be obtained by simply applying constant duty cycle control, the average input line current is not sinusoidal due to the non-proportional inductor discharging interval, which results in a relatively high input current THD. To lower the input current THD, the non-proportional discharging interval can be alleviated by increasing the DC bus voltage (i.e., increasing the voltage transfer ratio), which, in turn, increases the switch voltage stress and cost. In practice, designers have demonstrated that, even though problematic, the single-switch three-phase DCM boost converter is suitable for low cost, low power, medium performance three-phase AC/DC applications such as telecommunication applications due to its low cost, simple circuitry and simple control requirements.

Today, the power supply industry for telecommunication systems and the like has become very cost sensitive, with low production costs being a key to success. Additionally, the three-phase system THD requirement for telecommunication applications varies. Typically, the international market THD requirement for a three-phase AC/DC rectifier is often about 20%. While for the domestic market, the THD requirement for a three-phase rectifier system is often below 40%. Since the single-switch three-phase boost converter is operated in continuous conduction mode (CCM), the power switch stresses, DC bus voltage level, EMI filter size and rectifier costs are lessened. Therefore, a commercial three-phase rectifier can have a lower parts count at a reduced cost. Unfortunately, the drawback to such a power conversion approach is that relatively high THD (32%) and relatively low power factor (0.92–0.95) are experienced.

Accordingly, what is needed in the art is a cost effective three-phase power conversion topology that achieves an increased power factor and reduced input current THD.

SUMMARY OF THE INVENTION

To address the above-discussed deficiencies of the prior art, the present invention provides, for use with a three-phase boost converter having a primary stage with a primary rectifier and a primary boost switch coupled between an input and output of the three-phase boost converter, an auxiliary stage, a method of reducing input current total harmonic distortion (THD) at the input of the three-phase boost converter, and a three-phase boost converter employing the auxiliary stage and method.

In one embodiment, the auxiliary stage includes: (1) an auxiliary rectifier coupled to the primary rectifier, (2) first, second and third auxiliary boost inductors interposed between the primary rectifier and the auxiliary rectifier and (3) an auxiliary boost switch, interposed between the auxiliary rectifier and the output, that conducts to induce corresponding phase currents through the first, second and third auxiliary boost inductors thereby reducing input current total harmonic distortion (THD) at the input of the three-phase boost converter.

The present invention introduces the broad concept of employing an auxiliary stage in a three-phase boost converter to reduce input current THD at the input of the converter by shaping the input current into a substantially sinusoidal waveform. In addition to providing satisfactory power factor correction, the three-phase boost converter exhibits low THD characteristics. The operation of the auxiliary stage provides additional advantages such as reducing the current stresses on the active switches of the three-phase boost converter. Further, interposing the first, second and third auxiliary boost inductors of the auxiliary stage between the primary rectifier and the auxiliary rectifier substantially reduces reverse recovery currents in the primary rectifier and also substantially reduces turn-on switching losses in the auxiliary boost switch.

In one embodiment of the present invention, the auxiliary boost switch transitions to a conducting state concurrently with the primary boost switch. The auxiliary switch therefore may transition to a conducting state at or near the time that the primary boost switch transitions to a conducting state. In related but alternative embodiments, the auxiliary switch may transition to a nonconducting state before, concurrently or after the primary boost switch transitions to a nonconducting state.

In one embodiment of the present invention, an auxiliary boost diode is coupled between the auxiliary boost switch and the output. In an advantageous embodiment the primary rectifier comprises a six-diode bridge. In another embodiment, an auxiliary boost diode is coupled to the auxiliary rectifier. In a related but alternative embodiment, the auxiliary rectifier comprises a six-diode bridge. Six-diode bridge rectifiers are known by those ordinarily skilled in the art. In yet another embodiment, the primary stage further comprises a primary boost inductor and primary boost diode coupled between the primary rectifier and the output.

In one embodiment of the present invention, the three-phase boost converter further includes an input filter. In an embodiment to be illustrated and described, the input filter includes an inductor and capacitor network. Any filter, however, is well within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
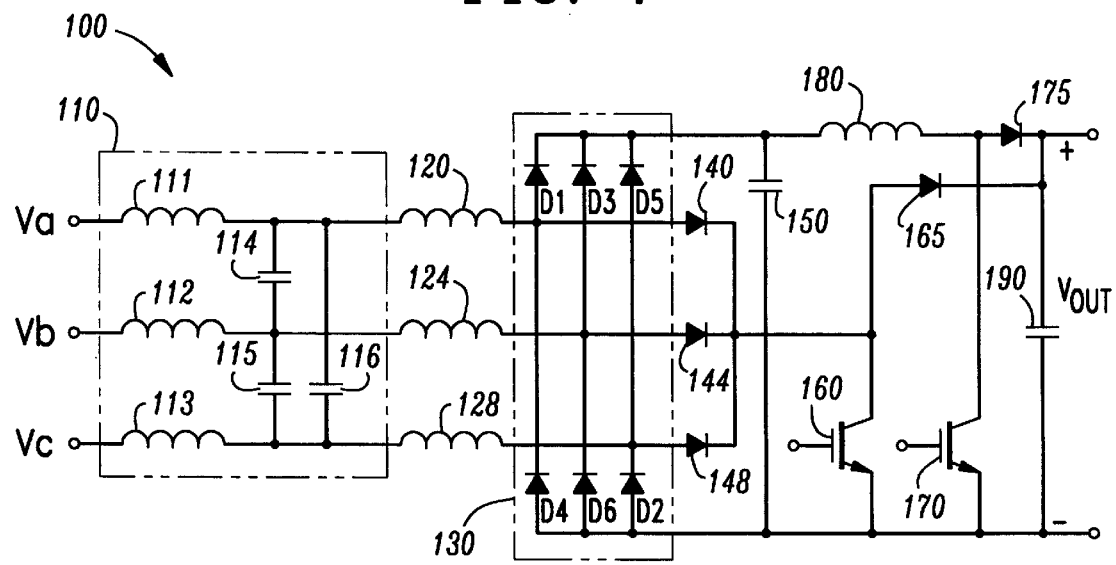
FIG. 1 illustrates a two-stage, low THD, three-phase boost converter.

Referring initially to FIG. 1, illustrated is a two-stage, low THD, three-phase boost converter 100. The converter 100 receives input power from a AC voltage source with three phases (illustrated as connected to phase voltages Va, Vb, Vc) through an EMI filter 110 including first, second and third filter inductors 111, 112, 113 and first, second and third filter capacitors 114, 115, 116. The first filter capacitor 114 is coupled between the first and second filter inductors 111, 112 and the second filter capacitor 115 is coupled between the second and third filter inductors 112, 113. Finally, to complete the EMI filter 110, the third filter capacitor 116 is coupled between the first and third filter inductors 111, 113.

First, second and third boost inductors 120, 124, 128 are further coupled to the first, second and third filter inductors 111, 112, 113, respectively. The first, second and third boost inductors 120, 124, 128 are also coupled to a three-phase diode-bridge rectifier 130 that includes a plurality of diodes D1–D6 arranged in a full bridge configuration. Further, seventh, eight and ninth input diodes 140, 144, 148 are coupled to the first, second and third boost inductors 120, 124, 128.

The converter 100 also includes a fourth filter capacitor 150 that is coupled across the rectified DC bus. The fourth filter capacitor 150 acts not only as a filter, but also to temporarily store necessary energy. The seventh, eight and ninth input diodes 140, 144, 148 are coupled to an auxiliary boost switch 160 and an auxiliary boost diode 165. A primary boost inductor 180 is coupled to the bridge rectifier 130 and to a primary boost switch 170 and a primary boost diode 175. The auxiliary and primary boost diodes 165, 175 are both coupled to an output capacitor 190, across which, an output voltage Vout is regulated.

For a better understanding of the aforementioned converter topology, see U.S. patent application Ser. No. 09/133, 105 (the '105 Application). The converter 100 overcomes many of the drawbacks of high switch current stress and high DC bus voltage stress found in the conventional single-switch, three-phase DCM boost converters and other converters for that matter. Since the main boost inductor current can be continuous in the converter 100, undesirable current and voltage stresses of the major components may be significantly reduced when compared to single-switch, three-phase DCM boost converters. Major portions of power within the converter 100 are processed by an efficient primary boost stage. The auxiliary stage manipulates a portion of the overall power to force the input current to flow continuously over an entire AC cycle. Consequently, the converter 100 can accommodate high power levels due to low current and voltage stresses on the switches and filter components.

As is well known, power diodes may experience reverse recovery (i.e., current flows through the diodes from the cathode to the anode) if the diodes conduct just before they are reverse biased. Unfortunately, during the turn-on transition of the auxiliary boost switch 160, some of the diodes in the diode-bridge rectifier 130 may be conducting since the primary boost inductor 180 is operated in CCM. When the auxiliary boost switch 160 is turned off, the seventh, eighth and ninth input diodes 140, 144, 148 are shorted. Input diodes D1, D3, D5 of the diode-bridge rectifier 130 are reverse-biased due to the fourth filter capacitor 150. As a result, some of the diodes D1, D3, D5 of the diode-bridge rectifier 130 experience reverse recovery. Furthermore, at the same time, a large reverse recovery current flows through the auxiliary boost switch 160. To compensate, the converter 100 preferably employs ultrafast-recovery input diode bridge rectifiers and a current limiting snubber circuit for the auxiliary boost switch 160 to limit the peak reverse recovery current and to reduce the turn-on loss when the input current of the converter 100 operates in CCM.

Figure 2:
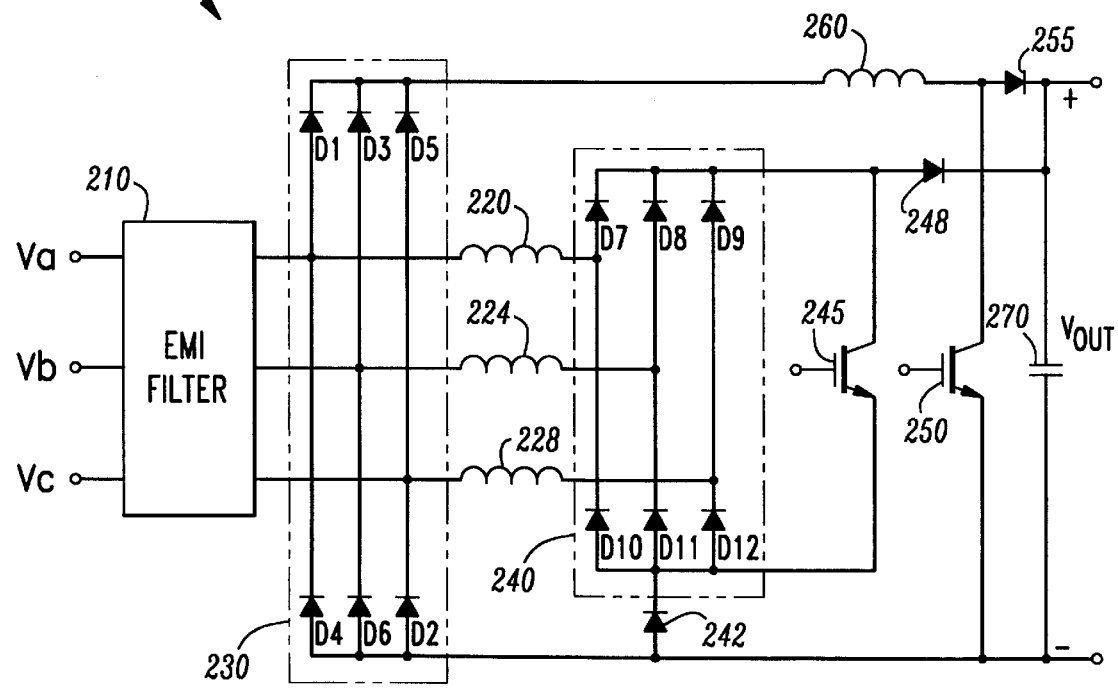
FIG. 2 illustrates an embodiment of a two-stage, low THD, three-phase boost converter constructed according to the principles of the present invention.

Turning now to FIG. 2, illustrated is an embodiment of a two-stage, low THD, three-phase boost converter 200 constructed according to the principles of the present invention. The converter 200 receives input power from a AC voltage source with three phases (illustrated as connected to phase voltages Va, Vb, Vc) through an EMI filter 210. A three-phase diode-bridge primary rectifier 230, which includes a plurality of diodes D1–D6, receives power from the phase voltages Va, Vb, Vc by way of the EMI filter 210. First, second and third boost inductors 220, 224, 228 are coupled between the primary rectifier 230 and a three-phase diode-bridge auxiliary rectifier 240, which also includes a plurality of diodes D7–D12.

An auxiliary boost switch 245 is coupled across the auxiliary rectifier 240 and a first auxiliary boost diode 248. A second auxiliary boost diode 242 is coupled to the auxiliary rectifier 240 to limit auxiliary currents from flowing into the primary rectifier 230. A primary boost inductor 260 is coupled to the primary rectifier 230 and to a primary boost switch 250 and a primary boost diode 255. The first auxiliary and primary boost diodes 248, 255 are both coupled to an output capacitor 270, across which, an output voltage Vout is regulated.

In essence, this converter 200 may be characterized as including a primary boost stage and an auxiliary boost stage. The primary boost stage includes the primary rectifier 230, the primary boost inductor 260, the primary boost switch 250 and the primary boost diode 255. The auxiliary boost stage includes the first, second and third boost inductors 220, 224, 228, the auxiliary rectifier 240, the second auxiliary boost diode 242, the auxiliary boost switch 245 and the first auxiliary boost diode 248.

An advantage of this configuration over the converter 100 of FIG. 1 is that the primary and auxiliary rectifiers 230, 240 experience reduced reverse recovery currents. Since the primary and auxiliary rectifiers 230, 240 experience reduced reverse recovery currents, low cost, standard recovery diodes may be employed rather than fast-recovery diodes or ultrafast-recovery diodes as preferred in the converter 100 of FIG. 1. Further, without employing the principles of the present invention, the auxiliary boost switch 245 may experience undesirably high peak current spikes during turn-on that results in extra power loss and heating. Finally, when reverse recovery condition occurs, the currents in the converter also may experience undesirably high peak current spikes that create various EMI problems and thermal design difficulties.

In operation, the auxiliary boost switch 245 conducts to short the auxiliary rectifier 240 and the first, second and third boost inductors 220, 224, 228. As a result, the currents in the first, second and third boost inductors 220, 224, 228 will increase or decrease corresponding to the respective individual three-phase line voltages. As opposed to the converter 100 of FIG. 1, the auxiliary boost switch 245 does not short the inputs to the primary rectifier 230. Therefore, temporary energy that was stored in the fourth filter capacitor 150 (of the converter 100 of FIG. 1) is not necessary in the converter 200 and thus the capacitor is employed therein. The primary boost stage can be operated in either CCM or in DCM.

Preferably, the primary boost stage processes the majority of the three-phase input power. The input current waveforms of the phases of the primary boost stage are of 120° conduction type with zero-current segments at line voltage zero-crossing areas. Conversely, the auxiliary boost stage is preferably operated in DCM. As a result, both the turn-on loss of the auxiliary boost switch 245 and the reverse recovery losses of both the auxiliary boost diodes 242, 248 are minimized. Primarily, the auxiliary boost stage is employed to fill in zero current segments in the input currents and to shape the input current waveshape into a sinusoidal form. As a result, input current THD is reduced.

The primary and auxiliary boost switches 250, 245 may be operated at different switching cycles. However, both switches are preferably switched at a fixed switching frequency, turning on at the same time, but not necessarily turning off at the same time.

Since there are two controllable switches, there are at least four different operating modes, depending on the duty cycle of the primary and auxiliary boost switches 250, 245:

| 1) | DC2 < DC1: | Both switches 250, 245 operate in DCM mode. |
|---|---|---|
| 2) | DC2 < DC1: | Primary switch 250 in CCM mode. |
|   |   | Auxiliary switch 245 in DCM mode. |
| 3) | DC2 > DC1: | Both switches 250, 245 operate in DCM mode. |
| 4) | DC2 > DC1: | Primary switch 250 in CCM mode. |
|   |   | Auxiliary switch 245 in DCM mode. | where DC1 represents the duty cycle of the primary boost switch 250 and DC2 represents the duty cycle of the auxiliary boost switch 245. By properly sizing the boost inductors 220, 224, 228 and the primary boost inductor 260, it is possible to make the input currents continuous and nearly sinusoidal, despite operating the auxiliary boost stage in DCM. The continuous input current feature reduces the current stresses on the primary boost switch 250 and the EMI filtering components while achieving low THD line rectification.

As with the '105 Application, the continuous input current reduces the current stresses on the active power switches. Consequently, the converter 200 can accommodate higher power levels due to, in part, the reduced current stresses on the switches. Further, since the input currents conduct at all times and mimic the sinusoidal input voltage waveform, the input current harmonics are reduced and the THD is improved since the sinusoidal waveform has substantially zero harmonics. Thus, the converter 200 reduces the input THD while not subjecting the primary and auxiliary rectifiers 230, 240 to reverse recovery currents. As a result, standard recovery diodes may be employed in the rectifiers 230, 240 rather than much more expensive specialized diodes. Finally, since the auxiliary switch 245 always turns on at zero current conditions, the switching losses are minimized and the converter 200 efficiency is improved.

While specific embodiments of a power converter and a method of reducing input current THD have been illustrated and described, other embodiments are well within the broad scope of the present invention. For a better understanding of switching power supplies, in general, see "Principles of Power Electronics" by John G. Kassakian, et al., Addison Wesley, Inc. (1991), and for boost topologies, see, "An Active Power Factor Correction Technique for Three-Phase Diode Rectifiers" by A. R. Prasad, et al., pp.58–66, 1989 IEEE PESC proceedings (1989) and "Optimum PWM Pattern for A 3- Phase Boost DCM PFC rectifier" by R. Zhang & F. C. Lee, pp.35–42, 1996 VPEC Annual Seminar proceeding (1996), which are incorporated herein by reference.

Although the present invention has been described in detail, those skilled in the art should understand that they can make various changes, substitutions and alterations herein without departing from the spirit and scope of the invention in its broadest form.

What is claimed is:

1. For use with a three-phase boost converter having a primary stage with a primary rectifier and a primary boost switch coupled between an input and output of said three-phase boost converter, an auxiliary stage, comprising:

an auxiliary rectifier coupled to said primary rectifier;

first, second and third auxiliary boost inductors interposed between said primary rectifier and said auxiliary rectifier; and an auxiliary boost switch, interposed between said auxiliary rectifier and said output, that conducts to induce corresponding phase currents through said first, second and third auxiliary boost inductors thereby reducing input current total harmonic distortion (THD) at said input of said three-phase boost converter.

2. The auxiliary stage as recited in claim 1 wherein said auxiliary boost switch transitions to a conducting state concurrently with said primary boost switch.

3. The auxiliary stage as recited in claim 1 further comprising an auxiliary boost diode coupled between said auxiliary boost switch and said output.

4. The auxiliary stage as recited in claim 1 further comprising an auxiliary diode coupled to said auxiliary rectifier.

5. The auxiliary stage as recited in claim 1 wherein said auxiliary rectifier comprises a six-diode bridge.

6. The auxiliary stage as recited in claim 1 wherein said primary stage further comprises a primary boost inductor and primary boost diode coupled between said primary rectifier and said output.

7. The auxiliary stage as recited in claim 1 wherein said three-phase boost converter further comprises an input filter.

8. For use with a three-phase boost converter having a primary stage with a primary rectifier and a primary boost switch coupled between an input and output of said three-phase boost converter, an method of reducing input current total harmonic distortion (THD) at said input of said three-phase boost converter, comprising:

coupling an auxiliary rectifier to said primary rectifier;

interposing first, second and third auxiliary boost inductors between said primary rectifier and said auxiliary rectifier;

interposing an auxiliary boost switch between said auxiliary rectifier and said output; and controlling said auxiliary boost switch to induce corresponding phase currents through said first, second and third auxiliary boost inductors thereby reducing input current THD.

9. The method as recited in claim 8 wherein said controlling comprises transitioning said auxiliary boost switch to a conducting state concurrently with said primary boost switch.

10. The method as recited in claim 8 further comprising coupling an auxiliary boost diode between said auxiliary boost switch and said output.

11. The method as recited in claim 8 further comprising coupling a control diode to said auxiliary rectifier.

12. The method as recited in claim 8 wherein said auxiliary rectifier comprises a six-diode bridge.

13. The method as recited in claim 8 further comprising filtering an input voltage of said three-phase boost converter.

14. The method as recited in claim 8 wherein said method substantially reduces reverse recovery energy in said primary rectifier and said auxiliary rectifier.

15. The method as recited in claim 8 wherein said method substantially reduces turn-on losses within said auxiliary boost switch.

16. A three-phase boost converter having an input and output, comprising:

a primary stage with a primary rectifier and a primary boost switch coupled between said input and said output;

an auxiliary stage, including:
an auxiliary rectifier coupled to said primary rectifier;
first, second and third auxiliary boost inductors interposed between said primary rectifier and said auxiliary rectifier; and
an auxiliary boost switch, interposed between said auxiliary rectifier and said output, that conducts to induce corresponding phase currents through said first, second and third auxiliary boost inductors thereby reducing input current total harmonic distortion (THD) at said input of said three-phase boost converter.

17. The three-phase boost converter as recited in claim 16 wherein said auxiliary boost switch transitions to a conducting state concurrently with said primary boost switch.

18. The three-phase boost converter as recited in claim 16 wherein said auxiliary stage further comprises an auxiliary boost diode coupled between said auxiliary boost switch and said output.

19. The three-phase boost converter as recited in claim 16 wherein said auxiliary stage further comprises a control diode coupled to said auxiliary rectifier.

20. The three-phase boost converter as recited in claim 16 wherein said auxiliary rectifier comprises a six-diode bridge.

21. The three-phase boost converter as recited in claim 16 wherein said primary stage further comprises a primary boost inductor and primary boost diode coupled between said primary rectifier and said output.

22. The three-phase boost converter as recited in claim 16 wherein said three-phase boost converter further comprises an input filter.

* * * * *